United States Patent
Udell et al.

(10) Patent No.: US 8,108,574 B2
(45) Date of Patent: Jan. 31, 2012

(54) APPARATUS AND METHODS FOR TRANSLATION OF DATA FORMATS BETWEEN MULTIPLE INTERFACE TYPES

(75) Inventors: John C. Udell, Colorado Springs, CO (US); Richard Solomon, Colorado Springs, CO (US); Eugene Saghi, Colorado Springs, CO (US); Jeffrey K. Whitt, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 433 days.

(21) Appl. No.: 12/247,769

(22) Filed: Oct. 8, 2008

(65) Prior Publication Data
US 2010/0088438 A1 Apr. 8, 2010

(51) Int. Cl.
*G06F 13/00* (2006.01)
*G06F 11/00* (2006.01)

(52) U.S. Cl. .......................... 710/52; 714/49
(58) Field of Classification Search ............ 710/52
See application file for complete search history.

(56) References Cited

U.S. PATENT DOCUMENTS

| | | | | |
|---|---|---|---|---|
| 6,625,689 | B2 * | 9/2003 | Narad et al. | 711/110 |
| 7,849,441 | B2 * | 12/2010 | Mukund et al. | 717/108 |
| 2005/0235072 | A1 * | 10/2005 | Smith et al. | 710/22 |
| 2010/0198936 | A1 * | 8/2010 | Burchard et al. | 709/212 |

* cited by examiner

*Primary Examiner* — Henry Tsai
*Assistant Examiner* — Titus Wong
(74) *Attorney, Agent, or Firm* — Duft Bornsen & Fishman LLP

(57) ABSTRACT

Apparatus and methods for translation of data formats between multiple interface types. Translation logic is interposed between a producer circuit and a consumer circuit to translate data formats of data signals generated by the producer for application to the consumer. The translation logic may include multiple translators to provide translations between any of multiple producer data formats and any of multiple consumer data formats. One or more producer circuits may thus be selectively coupled with one or more consumer circuits through the translation logic circuit.

12 Claims, 3 Drawing Sheets

APPARATUS AND METHODS FOR TRANSLATION OF DATA FORMATS BETWEEN MULTIPLE INTERFACE TYPES

BACKGROUND

1. Field of the Invention

The invention relates generally to interfaces between data producing circuits and data consuming circuits and more specifically relates to improved methods and apparatus for translating data formats between such producer and consumer circuits.

2. Related Patents

This patent application is related to U.S. patent application Ser. No. 12/247,785 filed herewith and entitled APPARATUS AND METHODS FOR CAPTURE OF FLOW CONTROL ERRORS IN CLOCK DOMAIN CROSSING DATA TRANSFERS which is hereby incorporated by reference.

3. Discussion of Related Art

It is common in electronics that a first circuit (a producer circuit) generates data signals to be applied to a second circuit (a consumer circuit). Such producer and consumer circuits often operate in accordance with a digital clock signal to trigger and pace the data exchange. In many electronic circuit applications the producer and consumer circuits operate in different clock domain—i.e., based on different frequency clock signals. For example, an I/O interface circuit may produce data for consumption by a processor (coupled through an interface bus). The I/O producer circuit may operate at a clock frequency relating to the I/O device or network for which it serves as an interface while the host system processor bus consumer circuit may operate at a clock frequency related to the operating speed and specifications of the interface bus logic. Exchanges between such producer/consumer circuits may be referred to as a cross-domain transfer in reference to the need to operate each circuit in a separate clock domain.

In such cross-domain transfers it is common to use a first in first out (FIFO) memory device as a speed matching or elasticity buffer to allow the producer to produce data at its designed speed while the consumer circuit consumes the data at its designed speed. In addition, it is often necessary in such application circuit designs that translation logic may be added to translate the format of data and control signals generated by the consumer circuit into an appropriate format for consumption by the consumer circuit. Even where the producer and consumer circuits operate in the same clock domain (often still using a FIFO coupling then to provide buffer elasticity), it is often required that signals produced by the consumer circuit be translated into an appropriate signal format for the consumer circuit to consume. The translation may include data and associated control signals generated by the producer and used by the consumer. To implement such a translation, present designs add translation logic to the consumer circuit so that the consumer will receive data (and related control signals) from the FIFO in the format that it is expecting.

If multiple producer circuits are used to send information to a single consumer circuit, the signals from each producer circuit must be converted into the correct format to match the consumer circuit's interface. Either each producer circuit must have knowledge of the consumer circuit's control interface and have additional logic to make the translation, or the consumer circuit must have knowledge of every possible producer circuit's interface and translate the signals to the correct format.

Performing the conversion in each consumer circuit relies on the consumer having knowledge of the signal interface used by each associated producer circuit that may transfer information to the consumer. This can result in duplicated logic if multiple producer circuits which use the same control interface are used since the translation logic is present in each instance of the consumer circuit. Likewise, placing the translation logic in the producer circuit requires the producer circuit to have knowledge of the control interface of every consumer circuit which may be added to the system.

Thus it is an ongoing challenge to reduce the complexity of an application circuit having producer circuits coupled with consumer circuits in data transfer applications where data format translations are required for signals exchanged between the circuits.

SUMMARY

The present invention solves the above and other problems, thereby advancing the state of the useful arts, by providing methods and apparatus for simplifying translation logic between producer circuits and consumer circuits in an application circuit. A single translation logic circuit is provided that translates all possible producer circuit signal formats into the appropriate format for a given type of consumer circuit. Multiplexing logic associated with the translation logic allows controlled selection of which type of producer signal format is to be translated into the associated consumer circuit format.

In one aspect hereof, an apparatus for data exchanges between a producer circuit and a consumer circuit is provided. The apparatus includes a first in first out (FIFO) memory having an output signal path coupled with an input signal path of the consumer circuit. The FIFO is adapted to store information produced by the producer circuit for consumption by the consumer circuit. The apparatus further includes translation logic having an input signal path coupled with an output signal path of the producer circuit and having an output signal path coupled with an input signal path of the FIFO. The translation logic is adapted to translate data signals received from the producer circuit in a producer data format into a consumer data format for application to and storage in the FIFO. The consumer circuit receives data in the consumer data format from the FIFO.

Another aspect hereof provides a system that includes a plurality of producer circuits, each having an output signal path. Each producer circuit is adapted to produce data signals in a corresponding producer data format and is adapted to apply the produced data signals to its output signal path. The system also includes a plurality of consumer circuits, each having an input signal path. Each consumer circuit is adapted to receive data signals on its input path in a corresponding consumer data format. The system further includes a plurality of first in first out (FIFO) memories. Each FIFO has an output signal path coupled with the input signal path of a corresponding consumer circuit and has an input signal path to receive data signals in the consumer data format of its corresponding consumer circuit. Each FIFO is adapted to store received data signals for retrieval by its corresponding consumer circuit. The system also includes a translation shim circuit coupled with the output signal path of each of the plurality of producer circuit and coupled with the input signal path of each of the plurality of FIFOs. The translation shim circuit is adapted to controllably select a selected producer circuit from the plurality of producer circuits and a selected consumer circuit from the plurality of consumer circuits. The translation shim is further adapted to translate data signals applied to the output signal path of the selected producer circuit from its producer data format into the consumer data format of the selected consumer circuit. The translation shim is further adapted to apply the translated data signals to the input signal path of the FIFO corresponding to the selected consumer circuit for storage and retrieval by the corresponding consumer circuit.

DETAILED DESCRIPTION OF THE DRAWINGS

Figure 1:
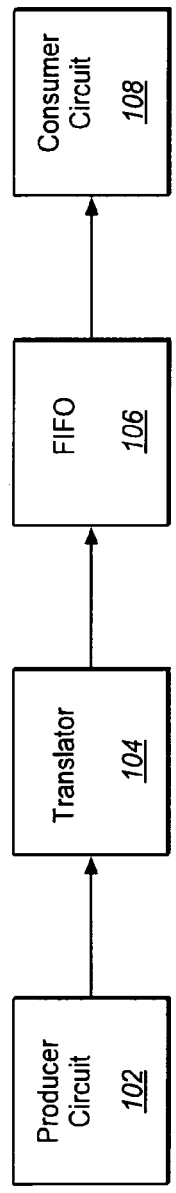
FIG. 1 is a block diagram of an exemplary apparatus in accordance with features and aspects hereof to provide translation of data signals generated by a producer circuit from a producer data format into a consumer data format for application to consumer circuit.

FIG. 1 is a block diagram of an apparatus 100 for coupling a producer circuit 102 with a consumer circuit 108. Producer circuit 102 generates data signals in a first data format—a producer data format. The data signals so generated are applied as input to translator 104. Translator 104 is adapted to translate data signals received from the producer circuit in the producer data format into a consumer data format for application to, and storage in, FIFO 106. Consumer circuit 108 then retrieves data, as required for processing, from the FIFO 106 already translated as required into the consumer data format used by the consumer circuit 108.

Although apparatus 100 of FIG. 1 depicts only a single producer circuit 102 coupled with a single consumer circuit 108 (via FIFO 106), the translation logic features and aspects hereof are more usefully applied where multiple producer circuits are implemented to generate data signals for application to a common consumer circuit. In such a case, as noted above, duplication of the translation logic as part of the consumer circuit design may be wasteful of critical resources in an application circuit design. Rather, translation logic in accordance with features and aspects hereof may provide multiple format translation capabilities such that multiple producers may share the same translation logic when they share the same producer data format.

Figure 2:
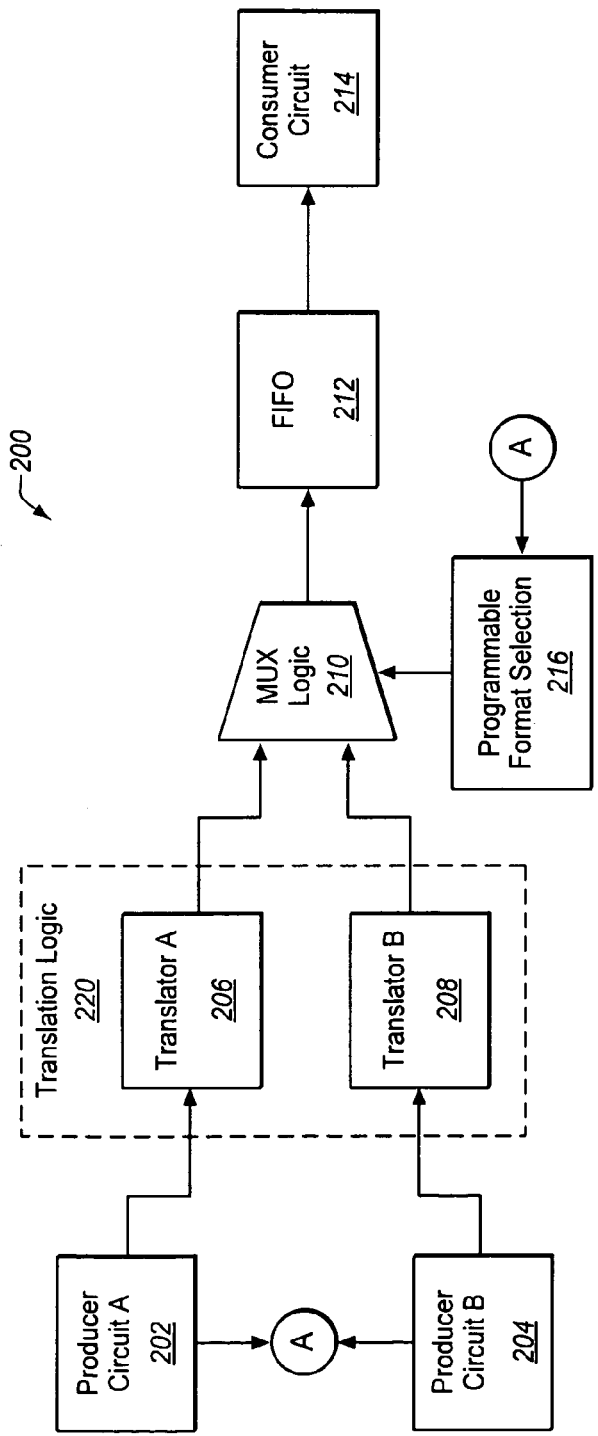
FIG. 2 is a block diagram of another exemplary apparatus in accordance with features and aspects hereof to provide translations of data formats of any of multiple producer circuits for application to a consumer circuit.

FIG. 2 is a block diagram depicting another exemplary apparatus 200 in which translation logic 220 is adapted to couple a selected one of multiple producer circuits 202 and 204 with consumer circuit 214. Translation logic 220 may include multiple translators each adapted for translating data signals from a corresponding producer data format into the consumer data format required by consumer circuit 214. For example, translator A 206 is adapted to translate a producer data format "A" into the consumer data format required by consumer circuit 214. Producer circuit A 202 generates data signals using producer data format "A". Translation logic 220 may also include, for example, translator B 208 adapted to translate data signals from producer data format "B" into the consumer data format required by consumer circuit 214. Producer circuit B 204 generates data signals in producer data format "B".

As shown in FIG. 2, producer circuit A 202 is directly coupled to translator A 206 to permit translation of data signals generated using producer data format "A" into the consumer data format. In like manner, producer circuit B 204 is directly coupled to translator B 208 to permit translation of data signals generated using producer data format "B" into the consumer data format. Though not shown in FIG. 2, where multiple producer circuits utilizing producer data format "A" are present in apparatus 200 and/or where multiple producer circuits utilizing producer data format "B" are present, translation logic 220 may be shared by such multiple producers to reduce complexity in the application circuit by eliminating redundant copies of the translation logic (specifically eliminating the need for duplicative circuitry for translator A 206 and translator B 208).

The translated data signals generated as output from translator A 206 and from translator B 208 are applied as inputs to multiplexing logic 210. Based on a selection signal applied to multiplexing logic 210 by programmable format selection circuit 216, one of the two translated data signals will be applied as output from multiplexing logic 210 to FIFO 212. The translated data signals may then be stored in FIFO 212 until consumer circuit 214 is ready to retrieve the stored data signals. The stored data signals will have been already converted (by operation of translator A 206 or translator B 208) into the consumer data format required for operation of consumer circuit 214. Programmable format selection circuit 216 may be, for example, a register that is programmed by signals generated by one of the producer circuits 202 or 204.

In operation of apparatus 200, producer circuit A 202, for example, would determine that it is ready to transfer data signals for use by consumer circuit 214. Responsive to such a determination, producer circuit A 202 generates a signal (label A) applied to programmable format selection circuit 216. Responsive to receipt of the applied signal, programmable format selection circuit 216 generates an appropriate selection signal and applies the selection signal to multiplexing logic 210 to select one of the two translated data signal inputs for application through the output of multiplexing logic 219 to FIFO 212.

Figure 3:
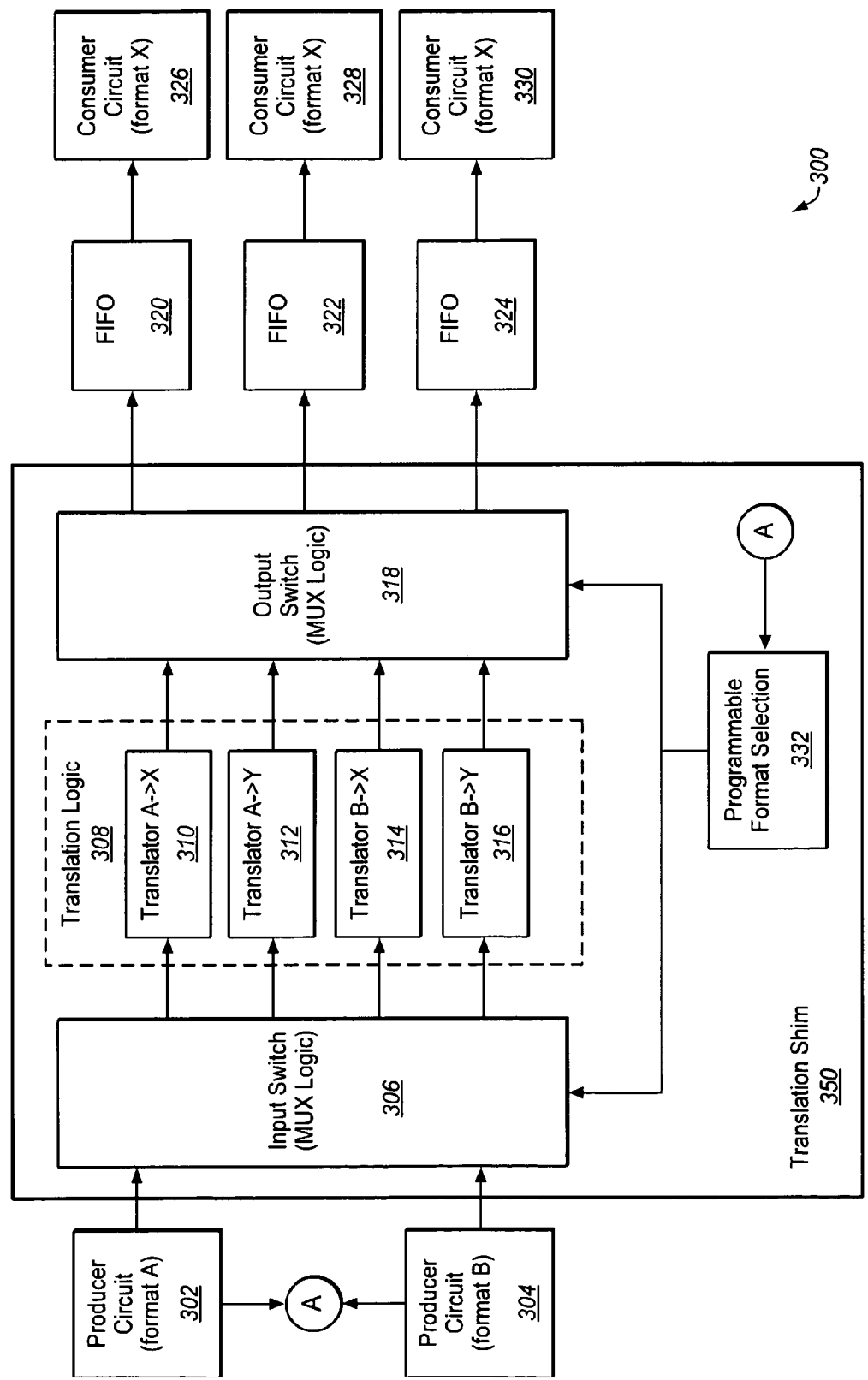
FIG. 3 is a block diagram of an exemplary system in accordance with features and aspects hereof in which a translation shim provides translation of data formats between the producer data format of any of multiple producer circuits into the consumer data format of any of multiple consumer circuits.

FIG. 3 is a block diagram of an exemplary system 300 providing translation shim 350 for coupling multiple producer circuits 302 and 304 with any of multiple consumer circuits 326, 328, and 330. In addition to selectively coupling one of the producer circuits with one of the consumer circuits, translation shim 350 provides required translation of a producer data format generated by one of the producer circuits 302 and 304 into an appropriate consumer data format corresponding to a selected one of the consumer circuits 326, 328, or 330. Programmable format selection circuit 332 in translation shim 350 receives a signal (label A) from a producer circuit 302 or 304 when the producer circuit is ready to generate and transfer data signals to a selected consumer circuit 326, 328, or 330. The programmable format selection circuit 332 receives the signal from the producer circuit and applies appropriate selection signals to input switch (multiplexing logic) 306 and to output switch (multiplexing logic) 318 in translation shim 350. Input switch 306 selectively couples one of the producer circuits 302 or 304 to one of the multiple translators 310, 312, 314, or 316. Each translator (310 through 316) is adapted to translate a corresponding producer data format into a corresponding consumer data format. For example, translator 310 is adapted to translate data signals in producer data format "A" into data signals having consumer data format "X". In like manner, translator 312 translates signals in producer data format "A" into consumer data format "Y", translator 314 translates signals in producer data format "B" into consumer data format "X", and translator 316 translates signals in producer data format "B" into consumer data format "Y".

The translated data signals output from each of translators 310 through 312 are applied as input to output switch 318. By appropriate selection signals generated from programmable format selection circuit 332 applied to output switch 318, one of the translator outputs is coupled with one of the FIFOs 320 through 324 corresponding with a desired, selected consumer circuit 326 through 330. Thus, translated data signals, translated into an appropriate consumer data format corresponding to a desired, selected consumer circuit, are applied to the corresponding FIFO for the selected consumer circuit and stored therein until the consumer circuit is ready to retrieve a next data signal.

Those of ordinary skill in the art will readily recognize that any number of translator circuits may be used within translation shim 350. Collectively, all translator circuits 310 through 316 may also be referred to herein as translation logic 308. Thus, translation shim 350 may support any number of producer circuits—each utilizing a corresponding producer data format—and may support any number of consumer circuits—each utilizing a corresponding consumer data format. Where multiple producer circuits utilize the same producer data format the translation shim 350 permits the translation logic to be shared and thus reduces the complexity of duplicative translator circuits in the application circuit of system 300. Likewise, where multiple consumer circuits utilize the same consumer data format, translation shim 350 serves to further reduce the duplication of translator circuits within the application circuit of system 300.

Still further, those of ordinary skill in the art will readily recognize that the signals generated by a producer circuit 302 or 304 and applied to programmable format selection 302 may include appropriate signals identifying the particular producer circuit to be coupled through input switch 306 to a particular identified translator 310 through 316. Likewise, the signal applied to programmable format selection circuit 332 may also designate which of the multiple consumer circuits 326 through 330 are to be coupled through corresponding FIFOs and output switch 318 to receive the translated data signals output from a selected translator 310 through 316. Specific circuitry for input switch 306 or output switch 318 as well as that of programmable format selection circuit 332 will be readily apparent to those of ordinary skill in the art as utilizing standard multiplexing logic circuits and other combinatorial and/or sequential logic. Still further, where multiple producer circuits share the same translation logic, well-known arbitration logic may be incorporated into the translation logic to permit fair sharing of the translation logic circuits.

Those of ordinary skill in the art will further recognize various additional and equivalent elements within a fully functional apparatus or system as depicted in FIGS. 1 through 3. Such additional and equivalent elements are omitted herein for simplicity and brevity of this discussion.

Figure 4:
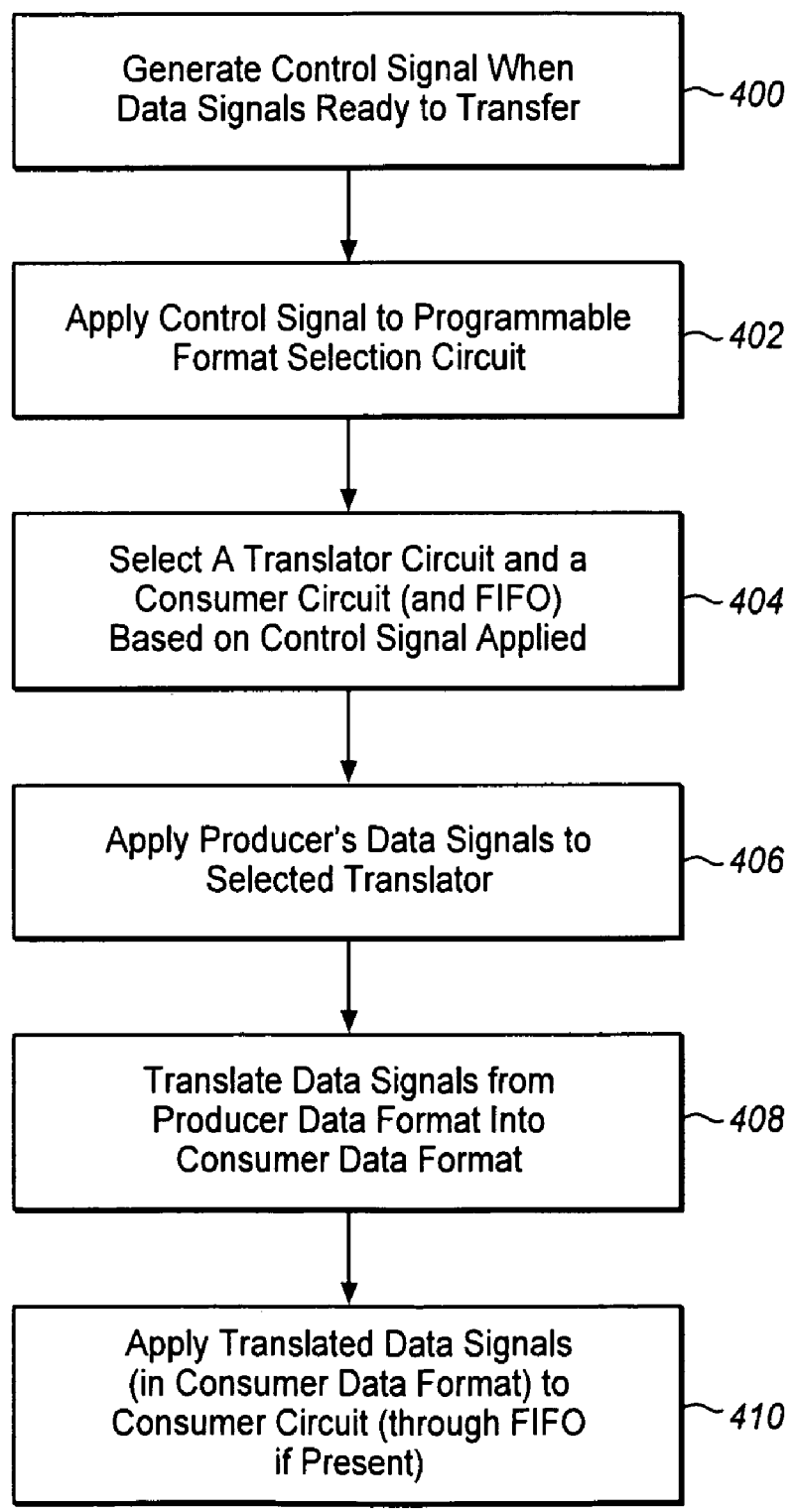
FIG. 4 is a flowchart describing an exemplary method for operating an apparatus or system in accordance with features and aspects hereof to provide translation of data formats between the producer data format of any of multiple producer circuits into the consumer data format of any of multiple consumer circuits.

FIG. 4 is a flowchart describing an exemplary method of operating an apparatus or system as exemplified by FIGS. 1 through 3 in accordance with features and aspects hereof. The method of FIG. 4 describes operations of the entire apparatus or system but particular method steps may be performed within particular functional circuits as exemplified in depicted in FIGS. 1 through 3. Step 400 generates a control signal when data signals are ready within a producer circuit (of one or more producer circuits). The data signals will be transferred to an identified consumer circuit. As noted above, the control signal may indicate which particular consumer circuit the data signals are intended to be applied to, the particular producer circuit requesting that the translation logic be configured, and the particular producer and consumer data formats involved in the desired translation. Step 402 then applies the generated control signal to a programmable format selection circuit adapted to control selection and multiplexing logic within the apparatus or system.

Step 404 represents processing within the apparatus or system through appropriate multiplexing or switching logic to select a particular translator circuit, a particular producer circuit, and a particular consumer circuit (and its corresponding FIFO) based on the control signal applied to the programmable format selection circuit. In general, the programmable format selection circuit decodes the received control signal to suitably program multiplexing and switching logic within the apparatus or system to couple an identified producer circuit with an appropriate translator circuit to generate translated data signals for application to an identified consumer circuit (through its corresponding FIFO).

With the translation logic of the apparatus or system suitably programmed by the programmable format selection circuit, step 406 then represents the producer circuit applying its data signals, in the producer data format, to the selected translator circuit. In step 408, the selected translator circuit translates the received data signals from the producer data format to generate translated data signals in the identified consumer data format associated with the identified, selected consumer circuit. Step 410 then represents application of the translated data signals (now translated into the desired consumer data format) to the selected consumer circuit (through its corresponding FIFO).

Those of ordinary skill in the art will readily recognize various additional and equivalent method steps in a fully operational method of FIG. 4. Such additional and equivalent method steps are omitted herein for simplicity and brevity of this discussion.

Those of ordinary skill in the art will further recognize that the apparatus, systems, and methods described above in FIGS. 1 through 4 may operate similarly in the absence of a FIFO associated with each corresponding consumer circuit. Where the producer and consumer circuits operate in the same clock domain and operate at relatively similar performance levels, there may be no need for a FIFO to serve as an elasticity buffer. Rather, producer circuits may generate data signals, apply those signals to a translator circuit for translation from the producer data format into a selected consumer data format, and the signals so translated may then be applied directly to the selected consumer circuit without an intermediate FIFO required.

Though applicable to many application circuits, the translation logic features and aspects hereof may be usefully applied, for example, to translate data signals produced by multiple producer circuits (e.g., a memory controller, an I/O interface circuit, etc.) for application to a consumer circuit such as a PCI Express bus interface.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. Apparatus for data exchanges between a producer circuit and a consumer circuit, the apparatus external to both the producer circuit and the consumer circuit, the apparatus comprising:
- a first in first out (FIFO) memory having an output signal path coupled with an input signal path of the consumer circuit, the FIFO adapted to store information produced by the producer circuit for consumption by the consumer circuit; and
- translation logic having an input signal path coupled with an output signal path of the producer circuit and having an output signal path coupled with an input signal path of the FIFO, the translation logic adapted to translate data signals received from the producer circuit in a producer data format into a consumer data format for application to and storage in the FIFO,
- wherein the consumer circuit receives data in the consumer data format from the FIFO,
- wherein the consumer circuit support receipt of data signals from the FIFO only in the consumer data format,
- wherein the producer circuit generates data signals only in the producer data format,
- wherein the producer data format is different from the consumer data format,
- wherein the translation logic is further adapted to select the producer data format from a plurality of supported data formats in response to a selection signal generated by the producer circuit.

2. The apparatus of claim 1
- wherein the translation logic is further adapted to be coupled with a plurality of producer circuits, and
- wherein the translation logic further comprises:
  - a plurality of translators,
    - each translator adapted to translate data received from a producer circuit in one of the plurality of supported data formats into output data in the consumer data format,
    - each translator further adapted to couple with a corresponding producer circuit of the plurality of producer circuits to receive data in a producer data format associated with the corresponding producer circuit,
    - and each translator adapted to apply its output data to an output signal path associated with the translator,
  - the apparatus further comprising:
  - multiplexing logic coupled with the output signal path of each of the plurality of translators to receive output data from each translator, the input multiplexing logic adapted to select a translator of the plurality of translators to apply its output data on its output signal path of to the input signal path of the FIFO.

3. The apparatus of claim 2 further comprising:
- a programmable format selection circuit having a selection signal input path coupled to receive the selection signal generated by each of the plurality of producer circuits, the format selection circuit having an output signal path coupled with a selection input signal path of the multiplexing logic and adapted to apply a selection signal to the format selection input signal path of the multiplexing logic to control selection of a translator by the multiplexing logic.

4. The apparatus of claim 1
- wherein the consumer circuit is a PCI Express bus interface circuit.

5. A system comprising:
- a plurality of producer circuits, each having an output signal path, each producer circuit adapted to produce data signals in a corresponding producer data format and adapted to apply the produced data signals to its output signal path;
- a plurality of consumer circuits, each having an input signal path, each consumer circuit adapted to receive data signals on its input path in a corresponding consumer data format;
- a plurality of first in first out (FIFO) memories, each having an output signal path coupled with the input signal path of a corresponding consumer circuit, each FIFO having an input signal path to receive data signals in the consumer data format of its corresponding consumer circuit, and each FIFO adapted to store received data signals for retrieval by its corresponding consumer circuit; and
- a translation shim circuit coupled with the output signal path of each of the plurality of producer circuits and coupled with the input signal path of each of the plurality of FIFOs, the translation shim circuit adapted to controllably select a selected producer circuit from the plurality of producer circuits and adapted to controllably select a selected consumer circuit from the plurality of consumer circuits, the translation shim further adapted to translate data signals applied to the output signal path of the selected producer circuit from its producer data format into the consumer data format of the selected consumer circuit, and the translation shim further adapted to apply the translated data signals to the input signal path of the FIFO corresponding to the selected consumer circuit for storage and retrieval by the corresponding consumer circuit.

6. The system of claim 5
wherein the translation shim further comprises:
- a plurality of translators each adapted to translate data signals from a corresponding producer data format to a corresponding consumer data format, each translator having an input signal path adapted to receive data signals in the corresponding producer data format and having an output signal path adapted to output the received data signals translated into the corresponding consumer data format; and
- switching logic adapted to couple the output signal path of the selected producer circuit with the input signal path of any one of the plurality of translators and adapted to couple the input signal path of the FIFO corresponding with the selected consumer circuit with the output signal path of any one of the plurality of translators.

7. The system of claim 6
wherein the translation shim further comprises:
- a programmable format selection circuit coupled with a selection input signal path of the switching logic to control the switching logic to select an identified translator of the plurality of translators for coupling with the selected producer circuit and for coupling with the FIFO corresponding to the selected consumer circuit wherein the identified translator receives and translates data signals produced by the producer circuit in the producer data format of the selected producer circuit and applies the translated data signals in the FIFO corresponding to the selected consumer circuit in the consumer data format of the selected consumer circuit.

8. The system of claim 7
wherein the programmable format selection circuit is coupled with each of the plurality of producer circuits, wherein a producer circuit applies a signal to the programmable format selection circuit before applying data signals on the output signal path of the producer circuit, and wherein the programmable format selection circuit generates the selection signal based on the signal received from the producer circuit.

9. The system of claim 5 wherein the translation shim further comprises:

a plurality of translators each adapted to translate data signals from a producer data format to a consumer data format;

an input switch coupled with the output signal path of each of the plurality of producer circuits and coupled with each of the plurality of translators, the input switch adapted to apply data signals generated by a selected producer circuit of the plurality of producer circuits as input to a selected translator of the plurality of translators; and an output switch coupled with each of the plurality of translators and coupled with the input signal path of each FIFO of the plurality of FIFOs, the output switch adapted to apply translated data signals generated by the selected translator as input to the FIFO corresponding to a selected consumer circuit.

10. The system of claim 9 wherein the translation shim further comprises:

a programmable format selection circuit, wherein the programmable format selection circuit is coupled with a selection input signal path of the input switch and coupled with a selection signal input path of the output switch, wherein the programmable format selection circuit is coupled with each of the plurality of producer circuits to receive a control signal, wherein the programmable format selection circuit is adapted to select the selected producer circuit and to select the selected translator and to select the selected consumer circuit based on the received control signal.

11. A method operable in an application circuit having a plurality of producer circuits and at least one consumer circuit wherein each producer circuit generates data signals in a corresponding producer data format and wherein the consumer circuit consumes data signals in a corresponding consumer data format, the method comprising:

generating a control signal in a selected producer circuit of the plurality of producer circuits, the control signal generated responsive to the selected producer circuit having data signals ready to transfer to the consumer circuit;

applying the control signal to a programmable format selection circuit;

selecting a selected translator circuit from a plurality of translator circuits based on the control signal;

applying the data signals from the selected producer circuit to the selected translator circuit;

translating the data signals in the selected translator circuit from the producer data format of the selected producer circuit into the consumer data format to generate translated data signals; and providing the translated data signals to the consumer circuit in the consumer data format.

12. The method of claim 11 wherein the step of providing further comprises:

applying the translated data signals to a first in first out (FIFO) memory associated with the consumer circuit; and retrieving the translated data from the FIFO into the consumer circuit.

\* \* \* \* \*